United States Patent
Zhao

(10) Patent No.: US 9,318,734 B2
(45) Date of Patent: *Apr. 19, 2016

(54) BIMETAL BUSS BAR ASSEMBLY

(71) Applicant: Tyco Electronics Corporation, Berwyn, PA (US)

(72) Inventor: Weiping Zhao, Superior Township, MI (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/839,567

(22) Filed: Mar. 15, 2013

(65) Prior Publication Data

US 2013/0306353 A1 Nov. 21, 2013

Related U.S. Application Data

(60) Provisional application No. 61/649,820, filed on May 21, 2012, provisional application No. 61/734,674, filed on Dec. 7, 2012, provisional application No. 61/735,310, filed on Dec. 10, 2012.

(51) Int. Cl.
  *H01M 2/20* (2006.01)
  *H01B 1/00* (2006.01)
(52) U.S. Cl.
  CPC .............. *H01M 2/202* (2013.01); *H01M 2/206* (2013.01)

(58) Field of Classification Search
  CPC ........................................................ H01B 1/00
  USPC ........................................................ 307/147
  See application file for complete search history.

(56) References Cited

U.S. PATENT DOCUMENTS

2013/0309537 A1* 11/2013 Zhao ............................... 429/99

FOREIGN PATENT DOCUMENTS

| EP | 2 393 144 A1 | 12/2011 |
| EP | 2 416 435 A1 | 2/2012 |
| WO | 2010 081083 A1 | 7/2010 |

OTHER PUBLICATIONS

International Search Report, International Application No. PCT/US2013/040743, International Filing Date, May 13, 2013.

* cited by examiner

*Primary Examiner* — Robert Deberadinis

(57) ABSTRACT

A bimetal buss bar assembly includes a positive battery cell terminal having a flat pad, a negative battery cell terminal having a flat pad, and a buss bar having a negative end and a positive end. The buss bar is attached to the positive battery cell terminal at the positive end and attached to the negative battery cell terminal at the negative end. At least one of the positive battery cell terminal, negative battery cell terminal, and buss bar have a bimetal interface.

24 Claims, 4 Drawing Sheets

BIMETAL BUSS BAR ASSEMBLY

CROSS REFERENCE TO RELATED APPLICATIONS

This application claims the benefit of U.S. Provisional Application No. 61/735,310 filed Dec. 10, 2012, titled BIMETAL BUSSBAR ASSEMBLY, U.S. Provisional Application No. 61/734,674 filed Dec. 7, 2012, titled BIMETAL BUSSBAR ASSEMBLY, and U.S. Provisional Application No. 61/649,820 filed May 21, 2012, titled BOLTLESS BATTERY CELL CONNECTION, the subject matter of which are herein incorporated by reference in its entirety.

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. Different types of battery modules are formed using different types of cells. For example, one type of battery modules are known as pouch type battery modules, another type of battery modules are known as prismatic battery modules, and a third type of battery modules are known as cylindrical battery modules.

Prismatic battery modules use prismatic battery cells that are stacked together. The positive and negative cell terminals are connected using buss bars. The positive and negative cell terminals typically include a threaded post or bolt. The buss bar is connected to the post using a nut. Such connections are time consuming, and may have other problems such as over or under torque, or cross threading. Typical battery modules include ten or more battery cells that are each connected together using the buss bars and nuts.

A need remains for battery modules that use low cost bimetal buss bars.

BRIEF DESCRIPTION OF THE INVENTION

In one embodiment, a bimetal buss bar assembly is provided that includes a positive battery cell terminal having a flat pad, a negative battery cell terminal having a flat pad, and a buss bar having a negative end and a positive end. The buss bar is attached to the positive battery cell terminal at the positive end and attached to the negative battery cell terminal at the negative end. At least one of the positive battery cell terminal, negative battery cell terminal, and buss bar have a bimetal interface.

Optionally, the positive cell terminal may be aluminum, the negative cell terminal may be copper, and the buss bar may be a copper block and an aluminum strip terminated to the copper block at the positive end to define the bimetal interface. The aluminum strip of the buss bar may be attached to the aluminum positive cell terminal. The aluminum strip may be inset within a profile of the buss bar. The buss bar may have a height and a width. The aluminum strip may have a height less than the height of the buss bar and a width less than the width of the buss bar. The copper block may extend the full width of the buss bar over the aluminum strip and the full height of the buss bar at the negative end. The aluminum strip may have a top, a bottom facing the flat pad of the positive battery cell, and an edge between the top and the bottom. The copper block may extend along the top and at least a segment of the edge to define the bimetal interface. The aluminum strip and the copper block may be jointed by cladding the aluminum strip and the copper block.

Optionally, the positive cell terminal may be aluminum, the buss bar may be aluminum, and the negative cell terminal may include a copper block having an aluminum strip terminated to the copper block at the flat pad to define the bimetal interface. The aluminum strip of the negative cell terminal may be attached to the aluminum buss bar.

Optionally, the positive cell terminal may be aluminum, the negative cell terminal may be copper, and the buss bar may include an aluminum block and a copper strip terminated to the aluminum block at the negative end to define the bimetal interface. The copper strip of the buss bar may be attached to the copper negative cell terminal.

Optionally, the negative cell terminal may be copper, the buss bar may be copper, and the positive cell terminal may include an aluminum block having a copper strip terminated to the aluminum block at the flat pad to define the bimetal interface. The copper strip of the positive cell terminal may be attached to the copper buss bar. The copper strip may be inset within a profile of the positive cell terminal. The positive cell terminal may have a profile defined by a height and a width. The copper strip may have a height less than the height of the positive cell terminal and a width less than the width of the buss bar. The aluminum block may extending the full width of the positive cell terminal under the copper strip and the full height of the positive cell terminal along at least a portion of the positive cell terminal to define at least a portion of the flat pad of the positive cell terminal. The copper strip may have a top defining at least a portion of the flat pad of the positive cell terminal, a bottom opposite the top, and an edge between the top and the bottom. The aluminum block may extend along the bottom and at least a segment of the edge to define the bimetal interface. The copper strip and the aluminum block may be jointed by cladding the copper strip and the aluminum block.

In another embodiment, a bimetal buss bar assembly is provided that includes a positive battery cell terminal having a flat pad and being aluminum, a negative battery cell terminal having a flat pad and being copper, and a bimetal buss bar having a negative end and a positive end. The buss bar includes a copper block and an aluminum strip terminated to the copper block at the positive end to define a bimetal interface. The copper block at the negative end of the buss bar is laser welded to the negative battery cell terminal at a laser weld interface and the aluminum strip at the positive end of the buss bar is laser welded to the positive batter cell terminal at a laser weld interface. Optionally, the aluminum strip may be inset within a profile of the buss bar. The aluminum strip and the copper block may be jointed by cladding the aluminum strip and the copper block.

In a further embodiment, a bimetal buss bar assembly is provided that includes a bimetal positive battery cell terminal having a flat pad, a copper negative battery cell terminal having a flat pad, and a copper buss bar having a negative end and a positive end. The bimetal positive battery cell terminal includes an aluminum block having a copper strip terminated to the aluminum block at the flat pad to define a bimetal interface. The buss bar includes a copper bar, wherein the copper bar at the negative end of the buss bar is laser welded to the negative battery cell terminal at a laser weld interface and the copper bar at the positive end of the buss bar is laser welded to the copper strip at a laser weld interface. Optionally, the copper strip may be inset within a profile of the positive cell terminal. The copper strip and the aluminum block may be jointed by cladding the copper strip and the aluminum block.

In another embodiment, a bimetal buss bar assembly is provided that includes a positive battery cell terminal having a flat pad and being aluminum, a negative battery cell terminal having a flat pad and being copper, and a bimetal buss bar having a negative end and a positive end. The buss bar includes an aluminum block and a copper strip terminated to the aluminum block at the negative end to define a bimetal interface. The aluminum block at the positive end of the buss bar is laser welded to the positive battery cell terminal at a laser weld interface and the copper strip at the negative end of the buss bar is laser welded to the negative battery cell terminal at a laser weld interface. Optionally, the copper strip may be inset within a profile of the buss bar. The copper strip and the aluminum block may be jointed by cladding the copper strip and the aluminum block.

In a further embodiment, a bimetal buss bar assembly is provided that includes a bimetal negative battery cell terminal having a flat pad, an aluminum negative battery cell terminal having a flat pad, and a aluminum buss bar having a negative end and a positive end. The bimetal negative battery cell terminal includes a copper block having an aluminum strip terminated to the copper block at the flat pad to define a bimetal interface. The buss bar includes an aluminum bar, wherein the aluminum bar at the positive end of the buss bar is laser welded to the positive battery cell terminal at a laser weld interface and the aluminum bar at the negative end of the buss bar is laser welded to the aluminum strip at a laser weld interface. Optionally, the aluminum strip may be inset within a profile of the negative cell terminal. The aluminum strip and the copper block may be jointed by cladding the aluminum strip and the copper block.

In another embodiment, a bimetal buss bar assembly is provided that includes a positive battery cell terminal having a flat pad and being aluminum, a negative battery cell terminal having a flat pad and being copper, and a bimetal buss bar having a negative end and a positive end. The buss bar includes a copper block and an aluminum block overlap terminated to the copper block at the middle of buss bar to define a bimetal interface. The copper block at the negative end of the buss bar is laser welded to the negative battery cell terminal at a laser weld interface and the aluminum block at the positive end of the buss bar is laser welded to the positive batter cell terminal at a laser weld interface. The aluminum block and the copper block may be jointed by cladding the aluminum block and the copper block.

In another embodiment, a bimetal buss bar assembly is provided that includes a positive battery cell terminal having a flat pad and being aluminum, a negative battery cell terminal having a flat pad and being copper, and a bimetal buss bar having a negative end and a positive end. The buss bar includes a copper block plated with alloy plating material configured to be welded to define a bimetal interface. The plated copper block at the negative end of the buss bar is laser welded to the negative battery cell terminal at a laser weld interface and at the positive end of the buss bar is laser welded to the positive batter cell terminal at a laser weld interface.

In a further embodiment, a bimetal buss bar assembly is provided that includes a bimetal positive battery cell terminal having a flat pad, a copper negative battery cell terminal having a flat pad, and a copper buss bar having a negative end and a positive end. The bimetal positive battery cell terminal includes an aluminum block having a copper block terminated to the aluminum block at a distance from flat pad to define a bimetal interface. The buss bar is a copper bar, where at the negative end of the buss bar is laser welded to the negative battery cell terminal at a laser weld interface and at the positive end of the buss bar is laser welded to the copper strip at a laser weld interface. The copper block and the aluminum block may be jointed by cladding the copper strip and the aluminum block.

In a further embodiment, a bimetal buss bar assembly is provided that includes a bimetal negative battery cell terminal having a flat pad, an aluminum positive battery cell terminal having a flat pad, and an aluminum buss bar having a negative end and a positive end. The bimetal negative battery cell terminal includes a copper block having an aluminum block terminated to the copper block at a distance from the flat pad to define a bimetal interface. The buss bar is an aluminum bar, where at the positive end of the buss bar is laser welded to the positive battery cell terminal at a laser weld interface and at the negative end of the buss bar is laser welded to the aluminum strip at a laser weld interface. The copper block and the aluminum block may be jointed by cladding the copper strip and the aluminum block.

DETAILED DESCRIPTION OF THE INVENTION

Figure 1:
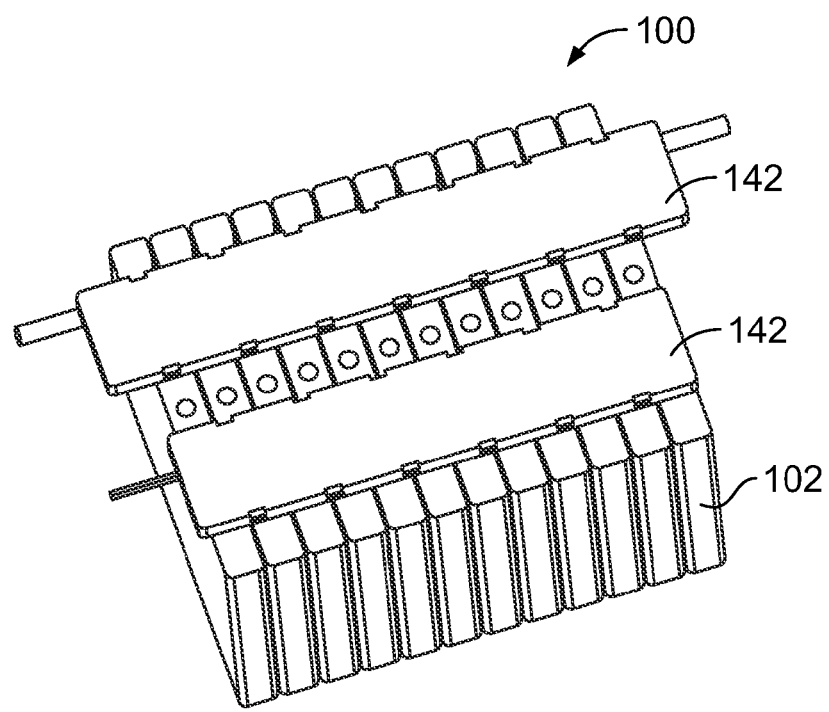
FIG. 1 is a top perspective view of a battery module formed in accordance with an exemplary embodiment.
Figure 2:
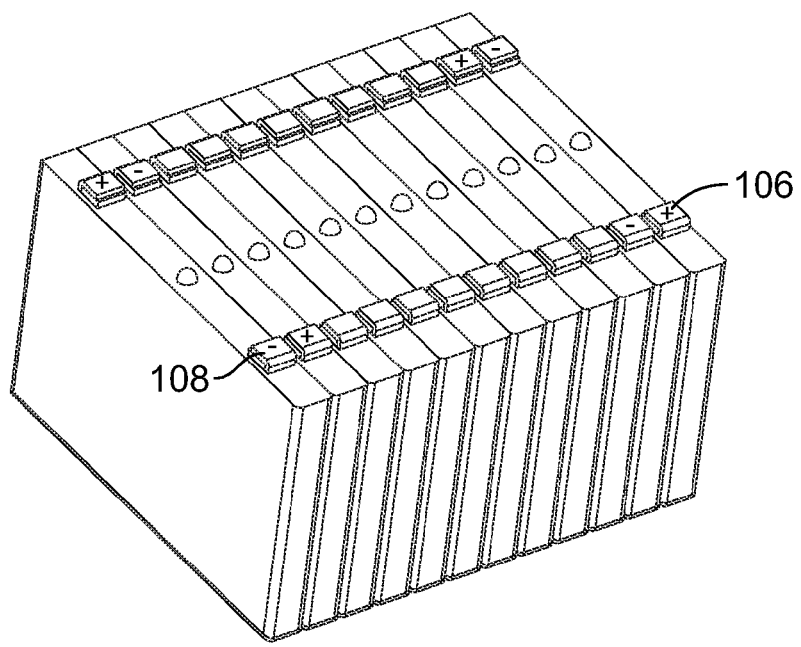
FIG. 2 is a top perspective view of a portion of the battery module shown in FIG. 1.

FIG. 1 is a top perspective view of a battery module 100 formed in accordance with an exemplary embodiment. FIG. 2 is a top perspective view of the battery module 100 with buss bar assemblies 134 (shown in FIG. 4) and a carrier 142 (shown in FIG. 1) for the buss bars 140 removed to illustrate battery cells 102 of the battery module 100. The battery module 100 may be used as part of a battery system in a vehicle, such as an electric vehicle or a hybrid electrical vehicle. The battery module 100 may be used in other applications in alternative embodiments. Multiple battery modules 100 may be ganged together to form a battery pack.

Each battery module 100 includes a plurality of prismatic battery cells 102. The prismatic battery cells 102 are arranged in a stacked configuration, side-by-side, to form the battery module 100. Optional, the battery module 100 may include a case or other housing that holds the prismatic battery cells 102. A battery cover may be provided over the tops of the prismatic battery cells 102. The battery cover may cover each of the prismatic battery cells 102.

Each battery module 100 includes a positive battery terminal 106 and a negative battery terminal 108. The terminals 106, 108 are configured to be coupled to an external power cable or alternatively may be bussed to battery cell terminals of another battery module 100. The end battery terminals 106, 108 are terminated to a battery terminal, which may be connected to a battery cable or to a battery cell of an adjacent battery module 100, such as using a module-to-module connector.

Figure 3:
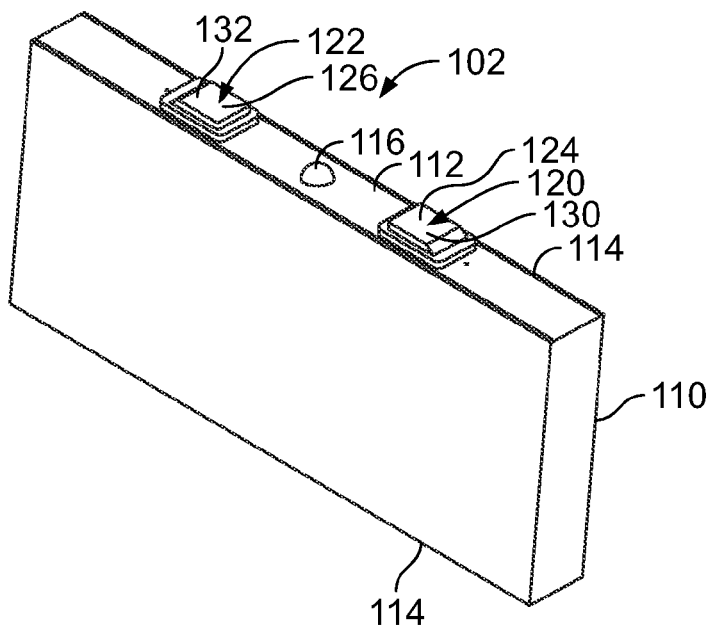
FIG. 3 is a top perspective view of a prismatic battery cell of the battery module.

FIG. 3 is a top perspective view of one of the prismatic battery cells 102 formed in accordance with exemplary embodiment. The prismatic battery cell 102 includes a cell housing 110 having a top 112 and side walls 114. In the illustrated embodiment, the cell housing 110 is boxed shaped having four side walls 114. The battery cell 102 has a gas pressure valve 116 on the top 112.

Each battery cell 102 includes a positive battery cell terminal 120 and a negative battery cell terminal 122. In an exemplary embodiment, the positive cell terminal 120 is connected to an adjacent negative battery cell terminal 122 of an adjacent battery cell 102 by welding a buss bar 140 (shown in FIG. 4) therebetween. Likewise, the negative cell terminal 122 is connected to an adjacent positive battery cell terminal 120 of an adjacent battery cell 102 by welding a buss bar 140 therebetween. The cell terminals 120, 122 of the end battery cells 102 may define the battery terminals 106, 108 (shown in FIG. 2).

In an exemplary embodiment, the positive cell terminal 120 is aluminum and the negative cell terminal 122 is copper (saying a component is made of a metal material includes components made from pure metal or from alloys of such metal materials). The positive cell terminal 120 includes a post or plate 124 extending from the top 112 that is used as a conductor or connection interface for the battery cell 102. The other end of cell terminal 120 extends into the battery cell. In the illustrated embodiment, the plate 124 includes a flat pad 130 having an upper surface that defines the conductor or connection interface. The negative cell terminal 122 includes a post or plate 126 extending from the top 112 that is used as a conductor or connection interface for the battery cell 102. The other end of cell terminal 122 extends into the battery cell. In the illustrated embodiment, the plate 126 includes a flat pad 132 having an upper surface that defines the conductor or connection interface.

Figure 4:
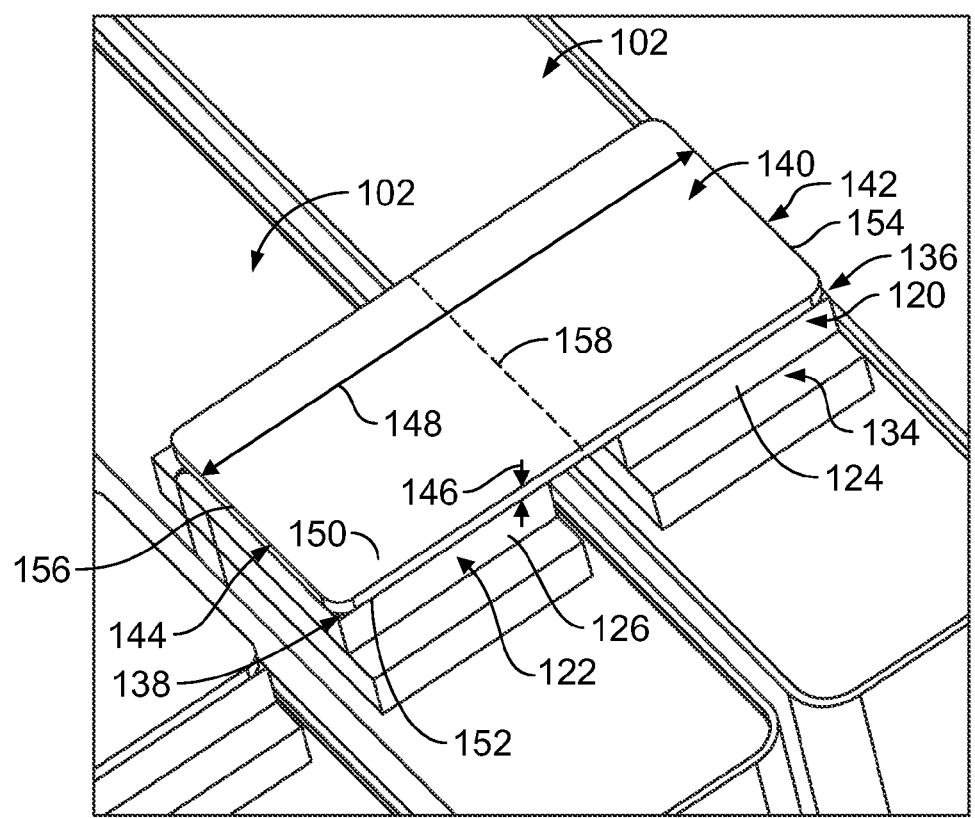
FIG. 4 is a top perspective view of a buss bar assembly for the battery module and formed in accordance with an exemplary embodiment.

FIG. 4 is a top perspective view of a buss bar assembly 134 formed in accordance with an exemplary embodiment. The buss bar assembly 134 is used to electrically connect cell terminals 120, 122 of adjacent prismatic battery cells 102. The buss bar assembly 134 includes a buss bar 140, the positive cell terminal plate 124 and the negative cell terminal plate 126. The buss bar 140 is configured to be terminated to a positive cell terminal 120 at a first interface 136 and a corresponding negative cell terminal 122 of the adjacent battery cell 102 at a second interface 138. In an exemplary embodiment, the buss bar 140 is terminated by laser welding to the terminals 120, 122, and as such, the interfaces 136, 138 define laser weld interfaces 136, 138, respectively.

In an exemplary embodiment, the buss bar assembly 134 includes a bimetal structure, generally including an aluminum (including an aluminum alloy) segment and a copper (including a copper alloy) segment, examples of which are illustrated in FIGS. 5-12. The segments meet at a bimetal interface 141, examples of which are illustrated in FIGS. 5-12. The bimetal interface 141 is defined along all abutting portions of the aluminum segment and the copper segment. In an exemplary embodiment, the bimetal interface 141 is non-coincident with the laser weld interfaces 136, 138. At the first laser weld interface 136, similar metal structures are laser welded together (e.g. both structures may be aluminum structures), and at the second laser weld interface 138, similar metal structures are laser welded together (e.g. both structures may be copper structures).

The buss bar 140 is a generally rectangular plate connected to the positive plate 124 at a positive end 142 of the buss bar 140 and connected to the negative plate 126 at a negative end 144 of the buss bar 140. In an exemplary embodiment, with additional reference to FIG. 5, the buss bar 140 has an envelope or profile defined by a height 146 and a width 148. The height 146 is defined between a top 150 and a bottom 152 of the buss bar 140. The bottom 152 faces the positive and negative plates 124, 126 and is configured to be terminated to the flat pads 130, 132 during assembly. In an exemplary embodiment, the bottom 152 is planar such that the interfaces 136, 138 are coplanar. The width 148 is defined between a first end 154 and a second end 156. The ends 154, 156 extend between the top 150 and the bottom 152. A centerline 158 is defined midway between the first and second ends 154, 156.

In an exemplary embedment, the buss bar 140 and the positive and negative plates 124, 126 are separately manufactured from each other and later terminated or joined during manufacture. Each may be a pure conductor or bimetal conductor. The bimetal conductor has two different conductive materials which two materials are jointed by laser welding, ultrasonic welding, cladding or other processes. In an exemplary embodiment, the positive end 142 and negative end 144 of the buss bar 140 are terminated to the positive and negative plates 124, 126, respectively, by laser welding, other welding means, or other attaching means at the interfaces 136, 138.

Figure 5:
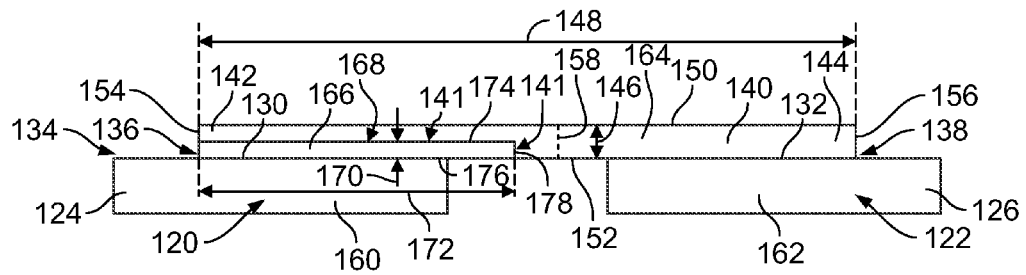
FIG. 5 is a cross sectional view of the buss bar assembly formed in accordance with an exemplary embodiment.

FIG. 5 is a cross sectional view of the buss bar assembly 134 formed in accordance with an exemplary embodiment. The buss bar assembly 134 is manufactured by attaching, such as by laser welding, the buss bar 140 to the positive and negative plates 124, 126 at the flat pads 130, 132. The positive plate 124 is made from an aluminum block 160. The negative plate 126 is made from a copper block 162. The "block" may be rectangular in cross-section or may have another shape, such as an L-shape with a post extending from the plate, in other embodiments.

In the embodiment of FIG. 5, the buss bar 140 is a bimetal bar generally manufactured of a layer or block 164 of copper material and having a layer or strip 166 of aluminum material applied at the positive end 142 adjacent the flat pad 130. The aluminum strip 166 is terminated to the copper block 164 at the bimetal interface 141. Optionally, the aluminum strip 166 may be mechanically and electrically connected to the copper block 164 by cladding the aluminum strip 166 and the copper block 164. The aluminum strip 166 may be terminated to the copper block 164 by other processes, such as laser welding, ultrasonically welding, or other suitable means in other embodiments. The aluminum strip 166 has a large surface area with which to connect to the copper block 164.

In an exemplary embodiment, the copper block 164 includes a pocket 168 defined within the envelope of the copper block 164 that receives the aluminum strip 166. The envelope may be the same envelope of the buss bar 140. The aluminum strip 166 is inset in the pocket 168 of the copper block 164 and fits within the envelope or profile of the copper block 164. The aluminum strip 166 has a height 170 less than the height 146 of the buss bar 140. The aluminum strip 166 has a width 172 less than the width 148 of the buss bar 140. The copper block 164 extends the full width 148 of the buss bar 140 over the aluminum strip 166. The copper block 164 extends the full height 146 of the buss bar 140 at the negative end 144. The aluminum strip 166 has a top 174, a bottom 176 facing the flat pad 130 of the positive battery cell terminal 120, and an edge 178 between the top 174 and the bottom 176. The copper block 164 extends along the top 174 and at least a segment of the edge 178 to define the bimetal interface 141 along two mutually perpendicular surfaces of the aluminum strip 166.

The buss bar assembly 134 is manufactured by terminating, both mechanically and electrically, the aluminum strip 166 of the buss bar 140 at the positive end 142 area to the positive flat pad 130 by laser welding or other suitable means. The copper block 164 of the buss bar 140 at the negative end 144 is terminated to the negative flat pad 132 by laser welding or other suitable means. The buss bar 140 is welded to the positive and negative plates 124, 126 such that the aluminum strip 166 of the positive end 142 of the buss bar 140 is welded to the aluminum pad 130 of the aluminum plate 124 and the copper block 164 at the negative end 144 of the buss bar 140 is welded to the copper pad 132 of the copper plate 126. Using the bimetal structure between the positive and negative cell terminal plates 124, 126 may reduce or eliminate galvanizing.

The buss bar 140 is coupled between adjacent battery cells 102 such that the positive plate 124 of the positive cell terminal 120 is terminated to one battery cell 102 and the negative plate 126 of a corresponding negative cell terminal 122 is terminated to the adjacent battery cell 102. In an exemplary embodiment, the plates 124, 126 are portions of corresponding terminals 120, 122. Laser welding eliminates the need for a nut and bolt on a threaded post. The buss bar 140 may be terminated more quickly by laser welding. The laser welding provides a good electrical connection between the buss bar 140 and the terminals 120, 122 (shown in FIG. 4), such as an interface having low interface resistance.

Figure 6:
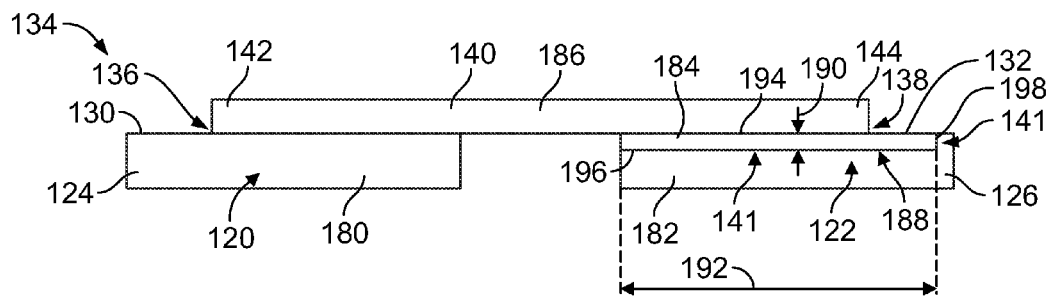
FIG. 6 is a cross sectional view of the buss bar assembly formed in accordance with an exemplary embodiment.

FIG. 6 is a cross sectional view of the buss bar assembly 134 formed in accordance with an exemplary embodiment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means. The buss bar 140 is welded to the positive and negative plates 124, 126 at the flat pads 130, 132, respectively.

In an exemplary embodiment, the positive plate 124 is made from an aluminum block 180. The negative plate 126 is a bimetal plate including a copper block 182 having a layer or strip 184 of aluminum material applied at the pad 132 adjacent to the buss bar 140. The buss bar 140 is a block or bar 186 of aluminum material. The buss bar assembly 134 is manufactured by terminating the aluminum strip 184 to the copper block 182, such as by cladding, laser welding, ultrasonically welding, or otherwise terminating the strip 184 to the block 182 to form the negative plate 126. The aluminum strip 184 is terminated to the copper block 182 at the bimetal interface 141. The aluminum strip 184 provides a large surface area for terminating to the copper block 182.

In an exemplary embodiment, the copper block 182 includes a pocket 188 defined within the envelope of the copper block 182 that receives the aluminum strip 184. The envelope may be the same envelope or profile of the negative plate 126. The aluminum strip 184 is inset in the pocket 188 of the copper block 182 and fits within the envelope or profile of the copper block 182. The aluminum strip 184 has a height 190 less than a height of the negative plate 126. The aluminum strip 184 has a width 192 less than a width of the negative plate 126. The copper block 182 extends the full width of the negative plate 126 under the aluminum strip 184. The copper block 182 extends the full height of the negative plate 126. The aluminum strip 184 has a top 194 defining at least a portion of the flat pad 132, a bottom 196 opposite the top 194, and an edge 198 between the top 194 and the bottom 196. The copper block 182 extends along the bottom 196 and at least a segment of the edge 198 to define the bimetal interface 141 along two mutually perpendicular surfaces of the aluminum strip 184.

The aluminum bar 186 is terminated to the negative plate 126, such as by laser welding or other suitable means at the laser weld interface 136. The aluminum bar 186 is terminated to the positive plate 124, such as by laser welding or other suitable means at the laser weld interface 138. Thus, the buss bar 140 is welded to the positive and negative plates 124, 126 such that the aluminum strip 184 of the negative plate 126 is welded to the aluminum negative end 144 of the buss bar 140 and the aluminum block 180 of the aluminum plate 124 is welded to the aluminum positive end 142 of the buss bar 140. Using the bimetal structure between the positive and negative cell terminal plates 124, 126 may reduce or eliminate galvanizing.

The buss bar 140 is coupled between adjacent battery cells 102 such that the positive plate 124 of the positive cell terminal 120 is terminated to one battery cell 102 and the negative plate 126 of a corresponding negative cell terminal 122 is terminated to the adjacent battery cell 102. In an exemplary embodiment, the plates 124, 126 are portions of corresponding terminals 120, 122. Laser welding eliminates the need for a nut and bolt on a threaded post. The buss bar 140 may be terminated more quickly by laser welding. The laser welding provides a good electrical connection between the buss bar 140 and the terminals 120, 122 (shown in FIG. 4), such as an interface having low interface resistance.

Figure 7:
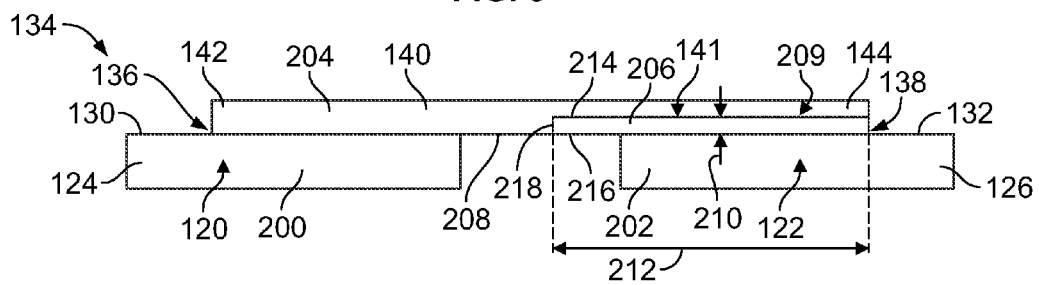
FIG. 7 is a cross sectional view of the buss bar assembly formed in accordance with an exemplary embedment.

FIG. 7 is a cross sectional view of the buss bar assembly 134 formed in accordance with an exemplary embodiment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means. The buss bar 140 is welded to the positive and negative plates 124, 126 at the flat pads 130, 132, respectively.

In an exemplary embodiment, the positive plate 124 is made from an aluminum block 200. The negative plate 126 is made from a copper block 202. The buss bar 140 is a bimetal bar that includes an aluminum block 204 having a layer or strip 206 of copper material applied to a bottom 208 of the buss bar 140 at the negative end 144. The buss bar assembly 134 is manufactured by terminating the copper strip 206 to the aluminum block 204, such as by cladding, melting, laser welding, ultrasonically welding, or otherwise terminating the strip 206 to the block 204 to form the buss bar 140. The copper strip 206 is terminated to the aluminum block 204 at the bimetal interface 141. The copper strip 206 provides a large surface area for terminating to the aluminum block 204.

In an exemplary embodiment, the aluminum block 204 includes a pocket 209 defined within the envelope of the aluminum block 204 that receives the copper strip 206. The envelope may be the same envelope of the buss bar 140. The copper strip 206 is inset in the pocket 209 of the aluminum block 204 and fits within the envelope or profile of the aluminum block 204. The copper strip 206 has a height 210 less than the height 146 of the buss bar 140. The copper strip 206 has a width 212 less than the width 148 of the buss bar 140.

The aluminum block 204 extends the full width 148 of the buss bar 140 over the copper strip 206. The aluminum block 204 extends the full height 146 of the buss bar 140 at the positive end 142. The copper strip 206 has a top 214, a bottom 216 facing the flat pad 132 of the negative battery cell 122, and an edge 218 between the top 214 and the bottom 216. The aluminum block 204 extends along the top 214 and at least a segment of the edge 218 to define the bimetal interface 141 along two mutually perpendicular surfaces of the copper strip 206.

The aluminum end of the buss bar 140 is terminated to the aluminum positive plate 124, such as by laser welding or other suitable means at the laser weld interface 136. The copper strip 206 is terminated to the copper negative plate 126, such as by laser welding or other suitable means at the laser weld interface 138. Thus, the buss bar 140 is welded to the positive and negative plates 124, 126 such that the copper strip 206 of the buss bar 140 is welded to the copper block 202 of the copper plate 126 and the aluminum block 204 of the buss bar 140 is welded to the aluminum block 200 of the aluminum plate 124. Using the bimetal structure between the positive and negative cell terminal plates 124, 126 may reduce or eliminate galvanizing.

The buss bar 140 is coupled between adjacent battery cells 102 such that the positive plate 124 of the positive cell terminal 120 is terminated to one battery cell 102 and the negative plate 126 of a corresponding negative cell terminal 122 is terminated to the adjacent battery cell 102. In an exemplary embodiment, the plates 124, 126 are portions of corresponding terminals 120, 122. Laser welding eliminates the need for a nut and bolt on a threaded post. The buss bar 140 may be terminated more quickly by laser welding. The laser welding provides a good electrical connection between the buss bar 140 and the terminals 120, 122 (shown in FIG. 4), such as an interface having low interface resistance.

Figure 8:
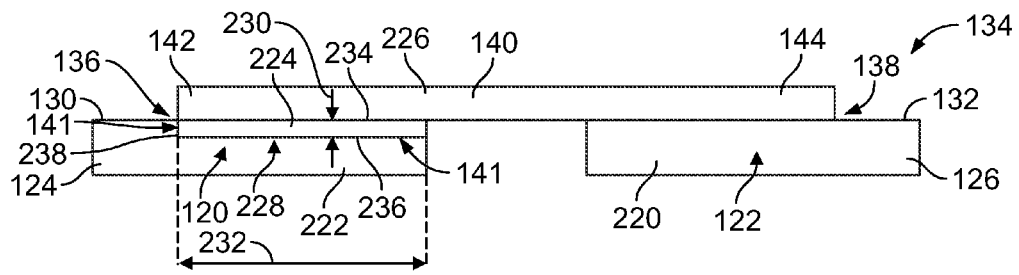
FIG. 8 is a cross sectional view of the buss bar assembly formed in accordance with an exemplary embedment.

FIG. 8 is a cross sectional view of the buss bar assembly 134 formed in accordance with an exemplary embodiment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means. The buss bar 140 is welded to the positive and negative plates 124, 126 at the flat pads 130, 132, respectively.

In an exemplary embodiment, the negative plate 126 is made from a copper block 220. The positive plate 124 is a bimetal plate including an aluminum block 222 having a layer or strip 224 of copper material applied at the pad 130 adjacent to the buss bar 140. The buss bar 140 is a block or bar 226 of copper material. The buss bar assembly 134 is manufactured by terminating the copper strip 224 to the aluminum block 222, such as by cladding, laser welding, melting, ultrasonically welding, or otherwise terminating the strip 224 to the block 222 to form the positive plate 124. The copper strip 224 is terminated to the aluminum block 222 at the bimetal interface 141. The copper strip 224 provides a large surface area for terminating to the aluminum block 222.

In an exemplary embodiment, the aluminum block 222 includes a pocket 228 defined within the envelope of the aluminum block 222 that receives the copper strip 224. The envelope may be the same envelope or profile of the positive plate 124. The copper strip 224 is inset in the pocket 228 of the aluminum block 222 and fits within the envelope or profile of the aluminum block 222. The copper strip 224 has a height 230 less than a height of the positive plate 124. The copper strip 224 has a width 232 less than a width of the positive plate 124. The aluminum block 222 extends the full width of the positive plate 124 under the copper strip 224. The aluminum block 222 extends the full height of the positive plate 124. The copper strip 224 has a top 234 defining at least a portion of the flat pad 130, a bottom 236 opposite the top 234, and an edge 238 between the top 234 and the bottom 236. The aluminum block 222 extends along the bottom 236 and at least a segment of the edge 238 to define the bimetal interface 141 along two mutually perpendicular surfaces of the copper strip 224.

The copper bar 226 is terminated to the positive copper strip 224 of the positive plate 124, such as by laser welding or other suitable means at the laser weld interface 136. The copper buss bar 226 is terminated to the copper negative plate 126, such as by laser welding or other suitable means at the laser weld interface 138. Thus, the buss bar 140 is welded to the positive and negative plates 124, 126 such that the copper strip 224 of the positive plate 124 is welded to the copper positive end 142 of the buss bar 140 and the copper block 220 of the copper plate 126 is welded to the copper negative end 144 of the buss bar 140. Using the bimetal structure between the positive and negative cell terminal plates 124, 126 may reduce or eliminate galvanizing.

The buss bar 140 is coupled between adjacent battery cells 102 such that the positive plate 124 of the positive cell terminal 120 is terminated to one battery cell 102 and the negative plate 126 of a corresponding negative cell terminal 122 is terminated to the adjacent battery cell 102. In an exemplary embodiment, the plates 124, 126 are portions of corresponding terminals 120, 122. Laser welding eliminates the need for a nut and bolt on a threaded post. The buss bar 140 may be terminated more quickly by laser welding. The laser welding provides a good electrical connection between the buss bar 140 and the terminals 120, 122 (shown in FIG. 4), such as an interface having low interface resistance.

Figure 9:
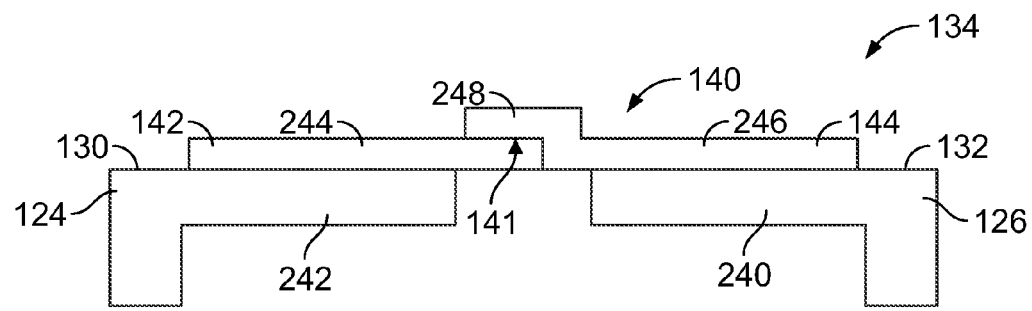
FIG. 9 is a cross sectional view of the buss bar assembly formed in accordance with an exemplary embodiment.

FIG. 9 is a cross sectional view of the buss bar assembly 134 formed in accordance with an exemplary embedment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means. The buss bar 140 is welded to the positive and negative plates 124, 126 at the flat pads 130, 132, respectively.

In an exemplary embodiment, the negative plate 126 is made from a copper block 240. The positive plate 124 is made from an aluminum block 242. The buss bar 140 is made from a bimetal plate including an aluminum block 244 at the positive end 142 and a copper block 246 at the negative end 144. A bridge 248 is defined at the bimetal interface 141 between the aluminum block 244 and the copper block 246.

The buss bar assembly 134 is manufactured by terminating the copper block 246 to the aluminum block 244, such as by cladding, laser welding, ultrasonically welding, or otherwise terminating the block 244 to the block 246 to form the buss bar 140. The bridge 248 provides a large surface area for terminating the copper block 246 to the aluminum block 244. The buss bar 140 is terminated to the positive aluminum plate 124, such as by laser welding or other suitable means. The buss bar 140 is terminated to the negative copper plate 126, such as by laser welding or other suitable means. Thus, the buss bar 140 is welded to the positive and negative plates 124, 126 such that the copper block 246 is welded to the negative plate 126 and the aluminum block 244 is welded to the positive plate 124. Using the bimetal structure between the positive and negative cell terminal plates 124, 126 may reduce or eliminate galvanizing.

Figure 10:
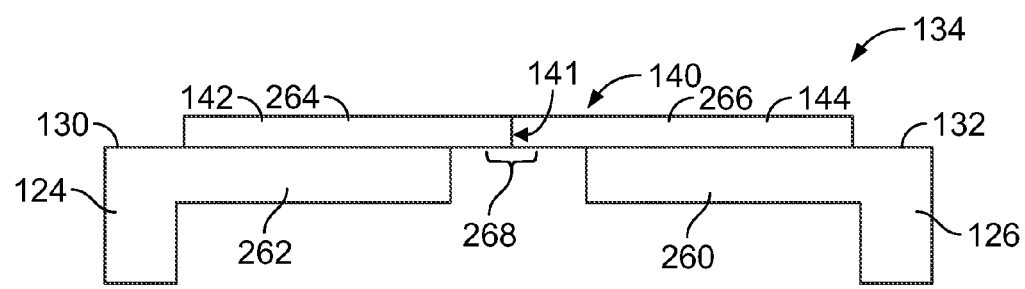
FIG. 10 is a cross sectional view of the buss bar assembly formed in accordance with an exemplary embodiment.

FIG. 10 is a cross sectional view of the buss bar assembly 134 formed in accordance with an exemplary embedment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means.

In an exemplary embodiment, the negative plate 126 is made from a copper block 260. The positive plate 124 is made from an aluminum block 262. The buss bar 140 is made from a bimetal plate including an aluminum block 264 at the positive end 142 and a copper block 266 at the negative end 144. A bridge 268 is defined at the bimetal interface 141 between the aluminum block 264 and the copper block 266. The buss bar assembly 134 is manufactured by terminating the copper block 266 to the aluminum block 264, such as by cladding, laser welding, ultrasonically welding, or otherwise terminating the block 264 to the block 266 to form the buss bar 140. The buss bar 140 is welded to the positive and negative plates 124, 126 such that the copper block 266 is welded to the negative plate 126 and the aluminum block 264 is welded to the positive plate 124. Using the bimetal structure between the positive and negative cell terminal plates 124, 126 may reduce or eliminate galvanizing.

Figure 11:
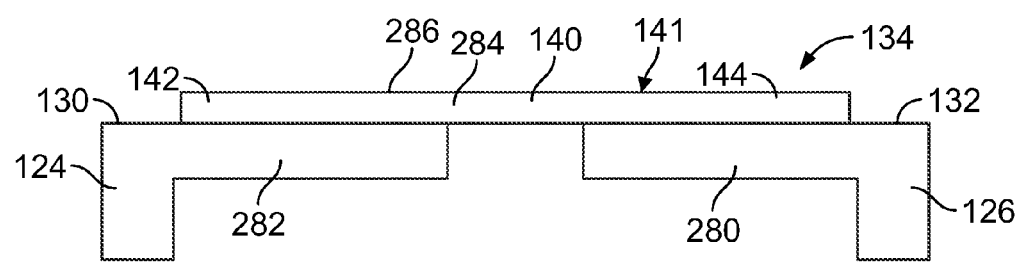
FIG. 11 is a cross sectional view of the buss bar assembly formed in accordance with an exemplary embedment.

FIG. 11 is a cross sectional view of the buss bar assembly 134 formed in accordance with an exemplary embedment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means.

In an exemplary embodiment, the negative plate 126 is made from a copper block 280. The positive plate 124 is made from an aluminum block 282. The buss bar 140 is made from a bimetal plate including a bar 284 and a coating 286 surrounding the bar 284. The coating 286 is a different metal material than the bar 284. The coating 286 provides galvanic protection against galvanizing. Using the bimetal structure between the positive and negative cell terminal plates 124, 126 may reduce or eliminate galvanizing.

Figure 12:
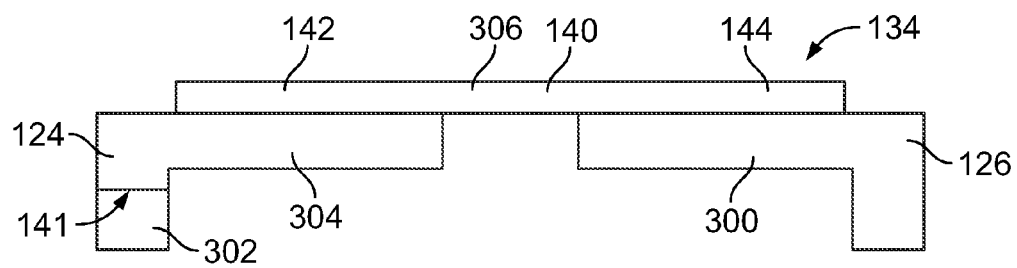
FIG. 12 is a cross sectional view of the buss bar assembly formed in accordance with an exemplary embodiment.

FIG. 12 is a cross sectional view of the buss bar assembly 134 formed in accordance with an exemplary embedment. The plates 124, 126 and the buss bar 140 of the buss bar assembly 134 are manufactured separately from one another and jointed together during manufacture. The positive end 142 and negative end 144 of the buss bar 140 are terminated to the positive and negative plates 124, 126, respectively, such as by laser welding, other welding or other attachment means.

In an exemplary embodiment, the negative plate 126 is made from a copper block 300. The positive plate 124 is a bimetal plate including an aluminum block 302 and a copper block 304 meeting at a bimetal interface 141. The buss bar 140 is a block or bar 306 of copper material. The buss bar assembly 134 is manufactured by terminating the copper block 304 to the aluminum block 302, such as by cladding, laser welding, ultrasonically welding, or otherwise terminating the block 304 to the block 302 to form the positive plate 124. The bar 306 is terminated to the positive copper block 304 of the positive plate 124, such as by laser welding or other suitable means. The bar 306 is terminated to the negative plate 126, such as by laser welding or other suitable means. Thus, the buss bar 140 is welded to the positive and negative plates 124, 126. Using the bimetal structure between the positive and negative cell terminal plates 124, 126 may reduce or eliminate galvanizing.

In an alternative embodiment, the positive plate 124 may be made as a bimetal plate in a similar manner, in which case the buss bar would be an aluminum bar rather than a copper bar. For example, the positive plate 124 may include an aluminum block at the top and an aluminum block at the bottom.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A bimetal buss bar assembly comprising:
a positive battery cell terminal having a flat pad;
a negative battery cell terminal having a flat pad; and
a buss bar having a negative end and a positive end;
wherein the buss bar is attached to the positive battery cell terminal at the positive end and attached to the negative battery cell terminal at the negative end, and wherein at least one of the positive battery cell terminal, negative battery cell terminal, and buss bar have a bimetal interface.

2. The bimetal buss bar assembly of claim 1, wherein the positive cell terminal is aluminum, the negative cell terminal is copper, and the buss bar comprises a copper block and an aluminum strip terminated to the copper block at the positive end to define the bimetal interface, the aluminum strip of the buss bar being attached to the aluminum positive cell terminal.

3. The bimetal buss bar assembly of claim 2, wherein the aluminum strip is inset within a profile of the buss bar.

4. The bimetal buss bar assembly of claim 2, wherein the buss bar has a profile defined by a height and a width, the aluminum strip having a height less than the height of the buss bar, the aluminum strip having a width less than the width of the buss bar, the copper block extending the full width of the buss bar over the aluminum strip, the copper block extending the full height of the buss bar at the negative end.

5. The bimetal buss bar assembly of claim 2, wherein the aluminum strip has a top, a bottom facing the flat pad of the positive battery cell, and an edge between the top and the bottom, the copper block extending along the top and at least a segment of the edge to define the bimetal interface.

6. The bimetal buss bar assembly of claim 2, wherein the aluminum strip and the copper block are jointed by cladding the aluminum strip and the copper block.

7. The bimetal buss bar assembly of claim 1, wherein the positive cell terminal is aluminum, the buss bar is aluminum, and the negative cell terminal comprises a copper block having an aluminum strip terminated to the copper block at the flat pad to define the bimetal interface, the aluminum strip of the negative cell terminal being attached to the aluminum buss bar.

8. The bimetal buss bar assembly of claim 1, wherein the positive cell terminal is aluminum, the negative cell terminal is copper, and the buss bar comprises an aluminum block and a copper strip terminated to the aluminum block at the negative end to define the bimetal interface, the copper strip of the buss bar being attached to the copper negative cell terminal.

9. The bimetal buss bar assembly of claim 1, wherein the negative cell terminal is copper, the buss bar is copper, and the positive cell terminal comprises an aluminum block having a copper strip terminated to the aluminum block at the flat pad to define the bimetal interface, the copper strip of the positive cell terminal being attached to the copper buss bar.

10. The bimetal buss bar assembly of claim 9, wherein the copper strip is inset within a profile of the positive cell terminal.

11. The bimetal buss bar assembly of claim 9, wherein the positive cell terminal has a profile defined by a height and a width, the copper strip having a height less than the height of the positive cell terminal, the copper strip having a width less than the width of the buss bar, the aluminum block extending the full width of the positive cell terminal under the copper strip, the aluminum block extending the full height of the positive cell terminal along at least a portion of the positive cell terminal to define at least a portion of the flat pad of the positive cell terminal.

12. The bimetal buss bar assembly of claim 9, wherein the copper strip has a top defining at least a portion of the flat pad of the positive cell terminal, a bottom opposite the top, and an edge between the top and the bottom, the aluminum block extending along the bottom and at least a segment of the edge to define the bimetal interface.

13. The bimetal buss bar assembly of claim 9, wherein the copper strip and the aluminum block are jointed by cladding the copper strip and the aluminum block.

14. The bimetal buss bar assembly of claim 1, wherein the positive cell terminal is aluminum, the negative cell terminal is copper, and the buss bar comprises an aluminum block and a copper block overlap terminated to the aluminum block at the middle to define the bimetal interface, the copper and aluminum blocks of the buss bar being attached to the copper negative and aluminum positive cell terminals.

15. The bimetal buss bar assembly of claim 1, wherein the positive cell terminal is aluminum, the negative cell terminal is copper, and the buss bar comprises a copper block plated with alloy plating material to define the bimetal interface, the plated copper block of the buss bar being attached to the copper negative and aluminum positive cell terminals.

16. The bimetal buss bar assembly of claim 1, wherein the positive cell terminal is aluminum, the buss bar is aluminum, and the negative cell terminal comprises a copper block having an aluminum block terminated to the copper block at a distance from flat pad to define the bimetal interface, the aluminum block of the negative cell terminal being attached to the aluminum buss bar.

17. The bimetal buss bar assembly of claim 1, wherein the negative cell terminal is copper, the buss bar is copper, and the positive cell terminal comprises an aluminum block having a copper block terminated to the aluminum block at a distance from flat pad to define the bimetal interface, the copper block of the positive cell terminal being attached to the copper buss bar.

18. A bimetal buss bar assembly comprising:
a positive battery cell terminal having a flat pad, the positive battery cell being aluminum;
a negative battery cell terminal having a flat pad, the negative battery cell being copper; and
a bimetal buss bar having a negative end and a positive end, the buss bar comprises a copper block and an aluminum strip terminated to the copper block at the positive end to define a bimetal interface, wherein the copper block at the negative end of the buss bar is laser welded to the negative battery cell terminal at a laser weld interface and wherein the aluminum strip at the positive end of the buss bar is laser welded to the positive batter cell terminal at a laser weld interface.

19. The bimetal buss bar assembly of claim 18, wherein the aluminum strip is inset within a profile of the buss bar.

20. The bimetal buss bar assembly of claim 18, wherein the buss bar has a profile defined by a height and a width, the aluminum strip having a height less than the height of the buss bar, the aluminum strip having a width less than the width of the buss bar, the copper block extending the full width of the buss bar over the aluminum strip, the copper block extending the full height of the buss bar at the negative end.

21. The bimetal buss bar assembly of claim 18, wherein the aluminum strip and the copper block are jointed by cladding the aluminum strip and the copper block.

22. A bimetal buss bar assembly comprising:
a positive battery cell terminal having a flat pad, the positive battery cell comprises an aluminum block having a copper strip terminated to the aluminum block at the flat pad to define a bimetal interface;
a negative battery cell terminal having a flat pad, the negative battery cell being copper; and
a bimetal buss bar having a negative end and a positive end, the buss bar comprises a copper bar, wherein the copper bar at the negative end of the buss bar is laser welded to the negative battery cell terminal at a laser weld interface and wherein the copper bar at the positive end of the buss bar is laser welded to the copper strip at a laser weld interface.

23. The bimetal buss bar assembly of claim 22, wherein the copper strip is inset within a profile of the positive cell terminal.

24. The bimetal buss bar assembly of claim 22, wherein the copper strip and the aluminum block are jointed by cladding the copper strip and the aluminum block.

* * * * *